United States Patent
Koyama et al.

(10) Patent No.: US 9,470,230 B2
(45) Date of Patent: Oct. 18, 2016

(54) REFRIGERANT COMPRESSOR AND REFRIGERATION CYCLE APPARATUS USING THE SAME

(75) Inventors: Masaki Koyama, Tokyo (JP); Eiji Sato, Tokyo (JP)

(73) Assignee: Johnson Controls-Hitachi Air Conditioning Technology (Hong Kong) Limited, Kowloon Bay KLN (HK)

( * ) Notice: Subject to any disclaimer, the term of this patent is extended or adjusted under 35 U.S.C. 154(b) by 363 days.

(21) Appl. No.: 14/110,613

(22) PCT Filed: Apr. 25, 2011

(86) PCT No.: PCT/JP2011/060032
§ 371 (c)(1),
(2), (4) Date: Nov. 1, 2013

(87) PCT Pub. No.: WO2012/147145
PCT Pub. Date: Nov. 1, 2012

(65) Prior Publication Data
US 2014/0056727 A1    Feb. 27, 2014

(51) Int. Cl.
*F04C 18/02* (2006.01)
*F04C 29/02* (2006.01)
(Continued)

(52) U.S. Cl.
CPC ......... *F04C 29/021* (2013.01); *F04B 39/0207* (2013.01); *F04B 39/0261* (2013.01); *F04C 15/0092* (2013.01); *F04C 18/0215* (2013.01); *F04C 23/008* (2013.01); *F04C 28/08* (2013.01); *F04C 29/028* (2013.01);
(Continued)

(58) Field of Classification Search
CPC ............ F04C 15/0088; F04C 15/0092; F04C 18/0215; F04C 29/0021; F04C 29/028; F04C 2240/403; F04C 29/021

USPC ....................... 417/281, 293, 310, 410.5, 902
See application file for complete search history.

(56) References Cited

U.S. PATENT DOCUMENTS 8,449,276 B2 * 5/2013 Bodart ................ F04C 18/0215
418/270
8,628,306 B2 * 1/2014 Shiibayashi ........ F04C 18/0215
417/410.5
(Continued)

FOREIGN PATENT DOCUMENTS

JP    3-258985 A    11/1991
JP    4-17793 A    1/1992
(Continued)

OTHER PUBLICATIONS

International Search Report dated Jul. 19, 2011 with English translation (ten (10) pages).
(Continued)

*Primary Examiner* — Peter J Bertheaud
(74) *Attorney, Agent, or Firm* — Crowell & Moring LLP

(57) ABSTRACT

A refrigerant compressor includes a sealed case, which contains a compression mechanism, a motor part, and an oil reservoir formed in a lower portion. An oil supply pipe links the oil reservoir and a suction side of the compression mechanism and introduces oil in the oil reservoir to the suction side. The amount of oil supply provided to the suction side is adjusted by detecting the rotational speed of the motor part, such that the amount of oil supply provided to the suction side of the oil supply pipe decreases as the rotational speed of the motor part increases.

8 Claims, 10 Drawing Sheets

(51) Int. Cl.
*F04C 15/00* (2006.01)
*F04C 23/00* (2006.01)
*F04B 39/02* (2006.01)
*F04C 28/08* (2006.01)
*F25B 31/00* (2006.01)
*F25B 49/02* (2006.01)
*F04C 29/04* (2006.01)
*F25B 13/00* (2006.01)

(52) U.S. Cl.
CPC .......... *F25B 31/004* (2013.01); *F25B 49/022* (2013.01); *F04B 2203/0209* (2013.01); *F04C 29/04* (2013.01); *F04C 2240/806* (2013.01); *F04C 2270/052* (2013.01); *F25B 13/00* (2013.01); *F25B 2600/021* (2013.01); *F25B 2700/171* (2013.01); *F25B 2700/1931* (2013.01); *F25B 2700/1933* (2013.01); *Y02B 30/741* (2013.01)

(56) References Cited

U.S. PATENT DOCUMENTS

| | | | | |
|---|---|---|---|---|
| 8,974,190 | B2* | 3/2015 | Bonnefoi | F04C 28/06 |
| | | | | 417/45 |
| 9,217,589 | B2* | 12/2015 | Bonnefoi | F25B 31/002 |
| 2004/0112679 | A1 | 6/2004 | Centers | |
| 2006/0210408 | A1 | 9/2006 | Ogasawara et al. | |
| 2009/0213787 | A1 | 8/2009 | Saito et al. | |
| 2010/0098570 | A1* | 4/2010 | Bodart | F04C 29/021 |
| | | | | 418/55.1 |
| 2013/0156612 | A1* | 6/2013 | Bonnefoi | F04C 29/021 |
| | | | | 417/212 |

FOREIGN PATENT DOCUMENTS

| | | |
|---|---|---|
| JP | 4-276193 A | 10/1992 |
| JP | 5-172077 A | 7/1993 |
| JP | 6-294388 A | 10/1994 |
| JP | 2000-283070 A | 10/2000 |
| JP | 2003-239880 A | 8/2003 |
| JP | 2005-201145 A | 7/2005 |
| JP | 2006-170500 A | 6/2006 |
| JP | 2006-283583 A | 10/2006 |
| JP | 2006-336543 A | 12/2006 |
| JP | 2007-232230 A | 9/2007 |
| WO | WO 2006/126369 A1 | 11/2006 |

OTHER PUBLICATIONS

Extended European Search Report dated Sep. 3, 2014 (Six (6) pages).

* cited by examiner

REFRIGERANT COMPRESSOR AND REFRIGERATION CYCLE APPARATUS USING THE SAME

TECHNICAL FIELD

The present invention relates to a refrigerant compressor, such as a rotary compressor and a scroll compressor used in a room air conditioner, a packaged air conditioner, a heat pump water heater, and the like, and a refrigeration cycle apparatus using the refrigerant compressor. Particularly, the present invention relates to a refrigerant compressor which are preferable for a refrigerant compressor for a refrigerating/air-conditioning circuit in an air conditioning and water heating system for a new generation house having efficient ecological effect (environmental compatibility), and can be operated under a wide range of operation within a motor-system drive signal frequency using a new refrigerant having small a global warming potential (GWP). Specifically, the present invention relates to a refrigerant compressor of which operation includes an operation of an ultra-low speed operation mode.

BACKGROUND ART

As discussed in Patent Literature 1, for example, high efficiency of a refrigerant compressor such as a scroll compressor is achieved by supplying a portion or all of refrigerating machine oil (hereinafter referred to as oil) used for lubricating bearings to a compression chamber which reduces leakage in the compression chamber. However, in the refrigerant compressor discussed in Patent Literature 1, the amount of oil supply cannot be adjusted when the compressor is operated, since the amount of oil supply to the compressor is determined by a fixed restriction provided on the oil supply line.

As discussed in Patent Literature 2, such refrigerant compressor is known in which a valve, which opens and closes the oil supply line, is provided along the oil supply line, and by the pressure difference between a high pressure portion and a low pressure portion, the valve opens and closes and varies the restriction on the oil supply line by two stages. In this manner, the amount of oil supply is adjusted.

Further, as for a refrigerant compressor used in a refrigerating apparatus including a hydraulic screw compressor or an air conditioning apparatus for a vehicle, it is known that the oil separated from a discharged refrigerant gas in an oil separator connected to a discharge side of the compressor is injected to the compression mechanism with the flow rate adjusted from the outside (e.g., see Patent Literatures 3 and 4).

CITATION LIST

Patent Literatures

PTL 1: Japanese Patent Application Laid-Open No. 2003-239880
PTL 2: Japanese Patent Application Laid-Open No. 2006-336543
PTL 3: Japanese Patent Application Laid-Open No. 2007-232230
PTL 4: Japanese Patent Application Laid-Open No. 2006-170500

SUMMARY OF INVENTION

Technical Problem

In recent years, in a view point of reducing energy consumed in conventional houses, that is, energy consumed by an air conditioner or a water heater, use of good heat insulating material for a heat insulator for buildings to reduce heat load is becoming a major trend. Also, there is an idea to embody a zero-fossil fuel house, of which the total sum of electric power consumed in a year is zero, by installing a solar generation or a solar water heater therein.

In such ideas, each refrigerant compressor used in an air conditioner or a water heater is required that its capacity can be controlled under a wide range. Particularly, under a low heat load condition, a refrigerant compressor is required to operate with a very low power. For example, in a case of cooling operation of an air conditioner, a rapid start operation is required since the room temperature is usually high when the operation is to be started. In such case, a high-capacity and high-speed operation (high-speed rotation) is carried out during the start. And when the room is cooled to some degrees, the operation changes from the start to a steady operation state which is a low-capacity and low-speed operation (low-speed rotation). Particularly, in a case when a refrigerant compressor is used in an air conditioner installed in a building implemented with a good heat insulating material, as a measure taken recently for energy savings, a low-speed operation during the steady operation state is carried out with a very low rotational speed (ultra-low speed operation mode).

In a refrigerant compressor discussed in Patent Literature 1 as mentioned above, the oil in a scroll-end-bearing room is introduced to a back pressure chamber by a pressure difference between the scroll-end-bearing room and the back pressure chamber, and then supplied to a compression chamber by passing through a suction portion. Therefore, there arises such problem that: under a low-load condition in which the pressure difference is small, it is difficult to obtain an amount of supply oil to keep sealability of a compression chamber; and on the other hand, under a high-load condition in which the pressure difference is large, the amount of oil supply is so large that volumetric efficiency is deteriorated because a suction refrigerant gas is heated by the oil. Consequently, when an operation is carried out under a condition with very low, or high, rotational speed, the efficiency is deteriorated.

In a refrigerant compressor discussed in Patent Literature 2, deterioration of volumetric efficiency due to suction heating caused by an excessive amount of oil supply under a high-load condition is prevented in a manner that: providing a valve which opens and closes a supply line; changing a restriction in the oil supply line by two stages by opening or closing the valve by a pressure difference between a high pressure portion and a low pressure portion; and restricting the amount of oil supply under a high pressure difference condition.

However, in a refrigerant compressor discussed in Patent Literature 2, adjustment of the amount of oil supply under a very low rotational speed (ultra-low speed operation mode) is not considered. And the open and close operation of the valve is independent of a rotational speed of a compressor, the compressor efficiency cannot be kept in a suitable degree during a period when the rotational speed changes.

And since a suitable amount of oil supply to the compression chamber is as little as 100 cc/min or less, restriction provided in an oil supply line should be a very shallow groove having a height as small as a few tens of micrometers or a very small hole having a diameter as small as a few hundreds of micrometers. These grooves and holes are difficult to be machined and are susceptible to clogging of foreign objects. For this reason, it is difficult to obtain such configuration capable to restrict the amount of oil supply to a suitable degree by using a conventional refrigerant compressor discussed in Patent Literature 1 or 2 as described above In a refrigerant compressor discussed in Patent Literatures 3 and 4, a flow rate of the oil separated from a discharged refrigerant gas in an oil separator connected to a discharge side of a compressor is controlled according to an operation condition, so as the oil to be supplied to a compression mechanism. However, this is carried out in order to prevent the temperature rise of the compressor. In other words, in the refrigerant compressor discussed in Patent Literature 3, the temperature of oil supplied to the compression mechanism is reduced by using an oil cooler, and a flow rate of the supply oil is adjusted according to the temperature of the discharged refrigerant gas. Thereby, the temperature rise of the discharged refrigerant gas is to be prevented.

Further, in the refrigerant compressor discussed in Patent Literature 4, an oil valve is controlled in the closing direction under a high-load condition so that a high temperature oil from an oil separator shall not be directly supplied to a suction side of a compressor. The temperature rise of the discharged refrigerant gas is to be prevented by returning a low temperature oil which has circulated the cycle.

As for the refrigerant compressors discussed in Patent Literature 3 or 4, the effect of reduction in heating loss can be expected, although the loss due to a leakage of a refrigerant in the compression chamber under an operation of low rotational speed which is a low-load condition is not considered. Therefore, an improvement in efficiency under a low-speed operation cannot be expected.

The object of the present invention is to provide a refrigerant compressor in which a leakage of a refrigerant in a compression chamber and a refrigerant-heating loss due to oil can be reduced to carry out an efficient operation under a wide range of operation from a high rotational speed to a very low rotational speed (ultra-low speed operation mode), and to provide a refrigeration cycle apparatus using the refrigerant compressor.

Solution to Problem

In order to achieve the above-described object, the present invention includes a refrigerant compressor including a sealed case, a compression mechanism contained in the sealed case, a motor part which is contained in the sealed case and drives the compression mechanism via a crank shaft, and an oil reservoir formed in a lower portion of the sealed case; the refrigerant compressor further including: an oil supply pipe which links an oil reservoir in the sealed case and a suction side of the compression mechanism by passage and introduces oil in the oil reservoir to the suction side; an oil supply amount adjusting means which is provided on the oil supply pipe and adjusts an amount of oil supply supplied to the suction side; a rotational speed detecting means which detects a rotational speed of the motor part; and an oil supply amount controlling unit which controls the oil supply amount adjusting means according to a rotational speed detected by the rotational speed detecting means, wherein the oil supply amount controlling unit is configured to control the oil supply amount adjusting means in a manner that an amount of oil supply supplied to the suction side from the oil supply pipe decreases as a rotational speed of the motor part increases.

Another aspect of the present invention is a refrigerant compressor including a sealed case, a compression mechanism contained in the sealed case, a motor part which is contained in the sealed case and drives the compression mechanism via a crank shaft, and an oil reservoir formed in a lower portion of the sealed case, the compression mechanism being configured so that a fixed scroll in which a scroll-shaped lap is vertically arranged on the base plate, and an orbiting scroll in which a scroll-shaped lap is vertically arranged on the end plate, engage with each other to form a plurality of compression chamber, a back pressure chamber which is kept in an intermediate pressure between a discharge pressure and a suction pressure is provided in the back side of the orbiting scroll, and the orbiting scroll is pressed toward the fixed scroll side by the intermediate pressure, the refrigerant compressor further including: an oil supply pipe which links an oil reservoir in the sealed case and the back pressure chamber by passage and introduces oil in the oil reservoir to the back pressure chamber; an oil supply amount adjusting means which is provided on the oil supply pipe and adjusts an amount of oil supply supplied to the back pressure chamber side; a rotational speed detecting means which detects a rotational speed of the motor part; and an oil supply amount controlling unit which controls the oil supply amount adjusting means according to a rotational speed detected by the rotational speed detecting means, wherein the oil supply amount controlling unit controls the oil supply amount adjusting means in a manner that an amount of oil supply supplied to the suction pipe from the oil supply pipe decreases as a rotational speed of the motor part increases.

Still another aspect of the present invention is a refrigeration cycle apparatus using a refrigerant compressor in which a refrigeration cycle of the refrigeration cycle apparatus is configured in a manner that a refrigerant compressor, an outdoor heat exchanger, an expansion valve, and an indoor heat exchanger are connected with a refrigerant tube, wherein the above-described refrigerant compressor is used as the refrigerant compressor, an outdoor temperature sensor which detects a temperature of the outdoor heat exchanger and a room temperature sensor which detects a temperature of the indoor heat exchanger are further provided, and an oil supply amount controlling unit provided in the refrigerant compressor carries out control so as to decrease an amount of oil supply as a rotational speed of a motor part increases, and further decreases the amount of oil supply as a temperature difference between a condensing temperature and an evaporating temperature detected by the outdoor temperature sensor and the room temperature sensor.

Advantageous Effects of Invention

According to the present invention, a refrigerant compressor in which a leakage of a refrigerant in a compression chamber and a refrigerant-heating loss due to oil can be reduced to carry out an efficient operation under a wide range of operation from a high-speed rotation to a very low rotational speed (ultra-low speed operation mode), and a refrigeration cycle apparatus using the refrigerant compressor can be provided.

DESCRIPTION OF EMBODIMENTS

Specific Examples of the present invention will be described below based on the drawings.

Example 1

Figure 1:
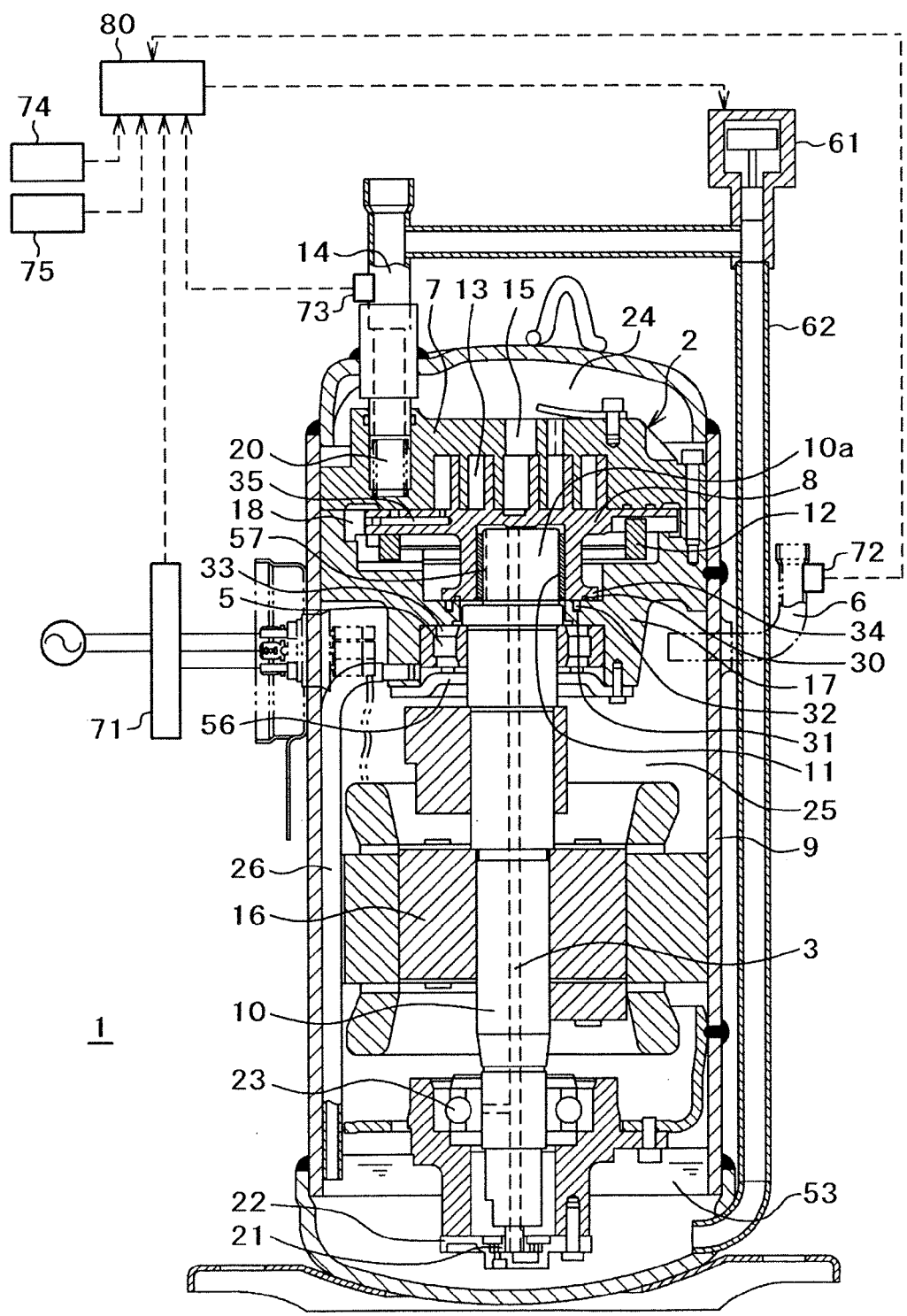
FIG. 1 is a longitudinal cross sectional view of a refrigerant compressor illustrating Example 1 of the present invention.

FIG. 1 is a longitudinal cross sectional view of a refrigerant compressor illustrating Example 1 of the present invention in which the present invention is applied to a scroll compressor.

A scroll compressor (compressor) 1 or a refrigerant compressor illustrated in FIG. 1 includes: a fixed scroll 7 having a disk-shaped base plate, a scroll-shaped lap vertically arranged on the base plate, and a cylinder-shaped support portion surrounding the lap with an end plate surface of the support portion continuously connected with a tip surface of the lap; and an orbiting scroll 8 having a disk-shaped end plate, a scroll-shaped lap vertically arranged on the end plate, and a boss portion provided in the middle of a back surface of the end plate. The orbiting scroll 8 is arranged in an opposite position to the fixed scroll 7 with the lap of the orbiting scroll engaged with the lap of the fixed scroll, and rotatably provided in the frame 17.

The fixed scroll 7 is fixed, by an outer circumference (support portion) thereof, to the frame 17 with bolts. The frame 17 integrally fixed with the fixed scroll 7 is fixed to a sealed case 9 by a fixing means such as welding. The outer circumference side of the orbiting scroll 8 forms an end plate surface which slides against the outer circumference side of the fixed scroll 7. The surface of the fixed scroll 7 which slides against the end plate surface of the orbiting scroll forms an end plate surface of the fixed scroll 7.

The sealed case 9 contains therein components such as a compression mechanism (scroll portion) 2 configured with the fixed scroll 7 and orbiting scroll 8, and the like, a motor part 16 for driving the compression mechanism 2 via a crank shaft 10, and a main bearing 5 and an auxiliary bearing 23 which rotatably support the crank shaft 10. Further, the sealed case 9 has a sealed container structure in which an oil reservoir 53 for accumulating lubricating oil is provided in the lower portion of the sealed case 9.

The crank shaft 10 is integrally fixed to a rotator (rotor) of the motor part 16 in which an axis of the crank shaft 10 is also a center line of the fixed scroll 7. A crank portion 10a is provided at a distal tip of the crank shaft 10. The crank portion 10a is inserted into a scroll-end bearing 11 provided in a boss portion 34 of the orbiting scroll 8. The orbiting scroll 8 is configured to rotate along with the rotation of the crank shaft 10. A center line of the orbiting scroll 8 is displaced from a center line of the fixed scroll 7 by a given distance. The lap of the orbiting scroll 8 overlap with the lap of the fixed scroll 7 with a given angle difference in the circumferential direction between each other. The orbiting scroll 8 is configured to relatively revolve against the fixed scroll 7 without rotation which is restricted by an Oldham-coupling ring 12.

A suction pipe 14 is provided so as to penetrate the sealed case 9 and to be linked to a suction chamber 20 in the outer circumference side of the fixed scroll 7. A discharge port 15 is formed in a region close to the scroll center of the fixed scroll base plate so as to be linked to a compression chamber 13 in an inner most circumference side of the fixed scroll 7.

When the crank shaft 10 is driven to rotate by the motor part 16, a rotation torque is transmitted to the orbiting scroll 8 via the crank portion 10a of the crank shaft 10 and the scroll-end bearing 11, and thereby the orbiting scroll 8 revolves about the center line of the fixed scroll 7 with a given rotation radius. By the revolution of the orbiting scroll 8, each compression chamber 13 formed between each pair of laps continually moves toward the center of the fixed scroll 7, by which the volume of the compression chamber 13 continually decreases. In this manner, a fluid sucked from a suction pipe 14 (e.g., a refrigerant gas which circulates in a refrigeration cycle) is consecutively compressed in each compression chamber 13 and the compressed fluid is discharged from a discharge port 15 to a discharge room 24 in the upper portion of the sealed case 9. The fluid discharged to the discharge room 24 flows, via a passage (not shown in the figure) formed between the outer circumference of the fixed scroll 7 and the frame 17 and an inner surface of the sealed case 9, into a motor room 25 where the motor part 16 is contained. Then after oil (lubricating oil, refrigerating machine oil) is separated, the fluid is supplied to the outside of the compressor, for example, to a refrigeration cycle, from the discharge pipe 6.

The oil separated from the refrigerant gas is accumulated in the oil reservoir 53 in the bottom portion of the sealed case 9. The oil in the oil reservoir 53 is supplied to sliding unit, such as a bearing, by a displacement-type or centrifugal-type oil supply pump 21 provided at the bottom end of the crank shaft 10. That is, the oil supply pump 21 rotates along with the rotation of the crank shaft 10, and thereby the oil in the oil reservoir 53 is sucked by the lubricating oil suction port provided on the oil supply pump case 22 and discharged from the discharge port of the oil supply pump 21. The discharged oil is supplied upward through an oil pass 3 formed to penetrated the crank shaft 10 in the axis direction thereof. A portion of the oil passing through the oil pass 3 is supplied to the auxiliary bearing 23 by passing through a side hole formed in the crank shaft 10 to lubricate the auxiliary bearing. Then the oil returns to the oil reservoir 53 in the bottom of the sealed case 9. Besides, the majority of the oil passing through the oil pass 3 reaches the top end of the crank shaft 10 by passing through the oil pass 3 and passes through an oil groove 57 provided in the outer circumference of the crank portion to lubricate the scroll-end bearing 11. The oil flows out from the scroll-end bearing 11 and then lubricates the main bearing 5 provided in the lower portion of the scroll-end bearing 11. And then the oil returns to the oil reservoir 53 by passing a drain pipe 26.

A space inside the bearing boss portion 34 in which the oil groove 57 and the scroll-end bearing 11 are provided and a space in which the main bearing 5 is contained (a space bounded by the frame 17, the crank shaft 10 and the frame seal (bearing support) 56, the bearing boss portion 34 having a flange at the bottom end, and a sealing part 32 provided between the bottom end surface of the bearing boss portion and the frame) together are referred to as a first room 33. The first room is a room having a pressure close to a discharge pressure.

The majority of the lubricating oil which flows into the first room 33 to lubricate the main bearing 5 and the scroll-end bearing 11 returns to the oil reservoir 53 by passing through the drain pipe 26. However, a portion of the lubricating oil, which is a minimum amount of the oil necessary for lubricating the Oldham-coupling ring 12 and a sliding portion between the fixed scroll 7 and the orbiting scroll 8, enters a back pressure chamber 18 which is a space enclosed by the frame 17, the fixed scroll 7, and the orbiting scroll 8 via an oil escape means (hole) 30 provided between the upper end surface of the sealing part 32 and the bottom end surface of the bearing boss portion 34.

The sealing part 32 is contained together with a wave-shaped spring (not shown in the drawing) in the circular annular groove 31 formed in the frame 17 and partitions the first room 33 having a discharge pressure and the back pressure chamber (the second room) 18 having an intermediate pressure between the suction pressure and the discharge pressure.

The oil escape means 30 is configured with a plurality of holes provided on the bottom end surface of the bearing boss portion 34. The plurality of holes moves in a circular motion along with the revolving motion of the orbiting scroll 8. The plurality of holes crosses the sealing part 32 from the first room 33 to the back pressure chamber (the second room) 18 and vice versa. In this manner, the lubricating oil in the first room 33 is kept within the hole (oil escape means) 30 and intermittently transferred to the back pressure chamber 18 side, thereby introducing a minimum required amount of the oil to the back pressure chamber 18. A slit or the like may be provided as an oil escape means 30 to the back pressure chamber 18 instead of the plurality of holes.

The oil which entered the back pressure chamber 18 flows into the compression chamber 13 by passing through a back pressure pass 35 which links the back pressure chamber 18 and the compression chamber 13 by passage. In other words, when the back pressure (pressure in the back pressure chamber 18) is higher than the pressure in the compression chamber 13 linked to the back pressure pass 35, the oil in the back pressure chamber 18 flows into the compression chamber 13 by the pressure difference there between. The oil flows into the compression chamber 13 and lubricates the sliding surfaces of the fixed scroll 7 and the orbiting scroll 8, and then is discharged with a refrigerant gas from the discharge port 15. The majority of the oil is separated from the refrigerant gas in the discharge room 24 and the motor room 25 and then accumulated in the oil reservoir 53. The residual oil is discharged together with the refrigerant gas to the refrigeration cycle from the discharge pipe 6.

By providing the first room 33, the back pressure chamber 18, and the oil escape means 30 as described above, a required amount of oil can be supplied to each of the bearings. Also, the amount of oil which lubricates the Oldham-coupling ring 12 and the sliding surfaces of the fixed scroll 7 and the orbiting scroll 8 and is finally discharged together with the refrigerant gas from the compression chamber 13 can be independently adjusted by the oil escape means 30. In this Example, the amount of oil leaking from the oil escape means 30 to the back pressure chamber 18 is kept to minimum. And the amount of oil supply required for the compression chamber, that is, the sliding surface of the lap, is suitably controlled by an oil supply amount adjusting means 61 which will be described later. Thereby, a refrigerant compressor having high efficiency and a refrigeration cycle apparatus using the refrigerant compressor can be obtained.

In the refrigerant compressor of the Example, an oil supply pipe 62 which links the oil reservoir 53 in the bottom portion of the sealed case 9 where lubricating oil is accumulated and the suction pipe 14 by passage is provided, as illustrated in FIG. 1. Further, an oil supply amount adjusting means 61 is provided along the oil supply pipe 62. In this Example, the oil supply amount adjusting means 61 is configured with a solenoid valve, and the solenoid valve 61 is configured to switch on/off (open/close) by a pulse width modulation control (herein after referred to as PWM control). In other words, when the solenoid valve 61 is switched on (opening), the high pressure oil reservoir 53 and the low pressure suction pipe 14 are linked via the oil supply pipe 62, thereby supplying the oil in the oil reservoir 53 to the suction pipe 14 side (suction side). Further, when the solenoid valve 61 is switched off (closing), the connection between the oil reservoir 53 and the suction pipe 14 is terminated, thereby stopping the oil supply.

The oil supply amount controlling unit 80 carries out flow rate control by controlling the solenoid valve 61 using the PWM control. The solenoid valve 61 is switched to a closing state or an opening state according to a period T1 and a period T2, each representing the period of the low state and the period of high state, respectively, of a square wave of a pulse width modulation control signal from a solenoid-driver circuit provided in the oil supply amount controlling unit 80. In this manner, the flow rate is controlled by changing the ratio of the period T1 to the period T2, which is easier to carry out flow control at a very small flow rate than a method of controlling flow rate by adjusting a degree of restriction such as a method using a needle valve. Also in this manner, a large flow area can be provided which avoids the problem of clogging caused by a foreign object.

A control of an amount of oil supply carried out by the oil supply amount controlling unit 80 will further be described specifically. In the Example, the oil supply amount controlling unit 80 determines the period T1 and the period T2 of a square wave of a pulse width modulation control signal according to a rotational speed detected by a rotational speed detecting means of the compressor. Further, the periods T1 and T2 of a pulse width modulation control signal from the solenoid-driver circuit are determined according to a predetermined table so as an amount of oil supply to the suction pipe 14 side of a refrigerant compressor be at an intended flow rate within a range of 0-60 cc/min.

A relation between an amount of oil supply Q and the periods T1 and T2 of the pulse width modulation control signal can basically be expressed with a flow coefficient C1 of the solenoid valve 61 which is determined by, for example, a flow resistance of a tube, a coefficient C2 related to a duty ratio and a flow rate, and a pressure difference ΔP as in an equation described below.

$$Q = C1 \cdot T2/(T1+T2) \cdot \Delta P \quad \text{Equation 1}$$
$$= C2 \cdot T2/(T1+T2)$$

Figure 2:
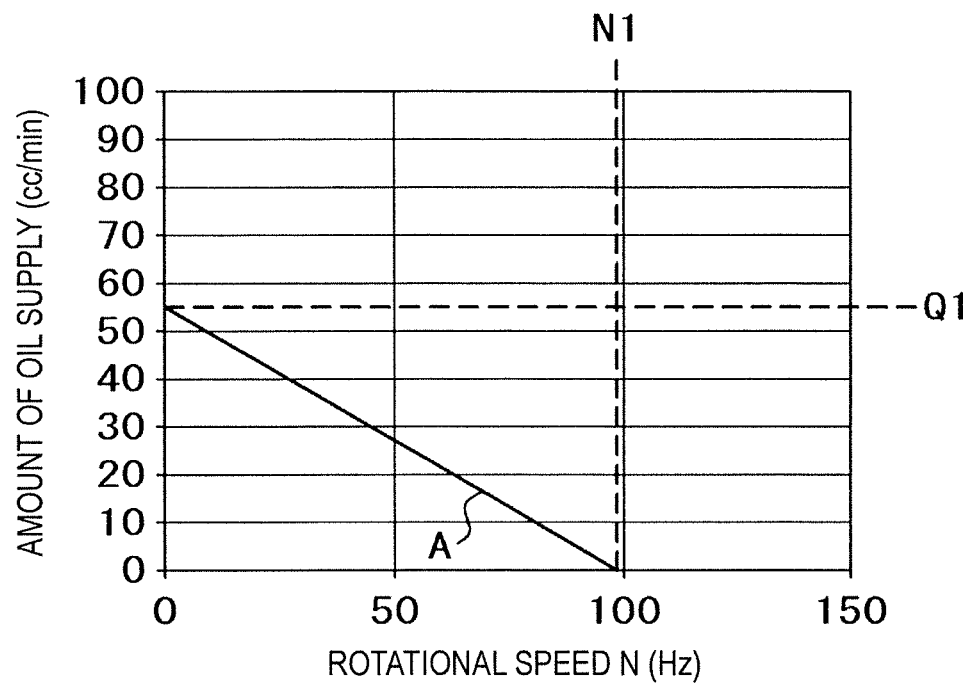
FIG. 2 is a chart illustrating a relation between a rotational speed of a compressor and an intended amount of oil supply according to Example 1 of the present invention.

In the Example, as described above, the intended flow rate is controlled according to the rotational speed of the compressor so as the amount of oil supply be within a range of 0-60 cc/min. The relation between the intended flow rate and the rotational speed of the compressor is illustrated in FIG. 2. In the Example, as illustrated in line A, the amount of oil supply is reduced as the rotational speed of the compressor increases so that when the rotational speed of the compressor is at a minimum rotational speed, the intended amount of oil supply is Q1 (e.g., 55 cc/min), and when the rotational speed of the compressor is N1 (e.g., 100 Hz), the intended amount of oil supply is 0 cc/min. The ratio of the period T1 to the period T2 of the pulse width modulation control signal may be varied to change the amount of oil supply along the line A.

The rotational speed detecting means of the compressor is configured so that the rotational speed is detected by input of a signal of an intended rotational speed for a compressor driving circuit 71 to the oil supply amount controlling apparatus 80. When the amount of oil supply is controlled for the intended rotational speed of the compressor, control is carried out in a manner that the amount of oil supply is Q1 when the rotational speed is at minimum, and the amount of oil supply is reduced as the rotational speed increases so as the amount of oil supply be 0 when the rotational speed is N1.

Figure 3:
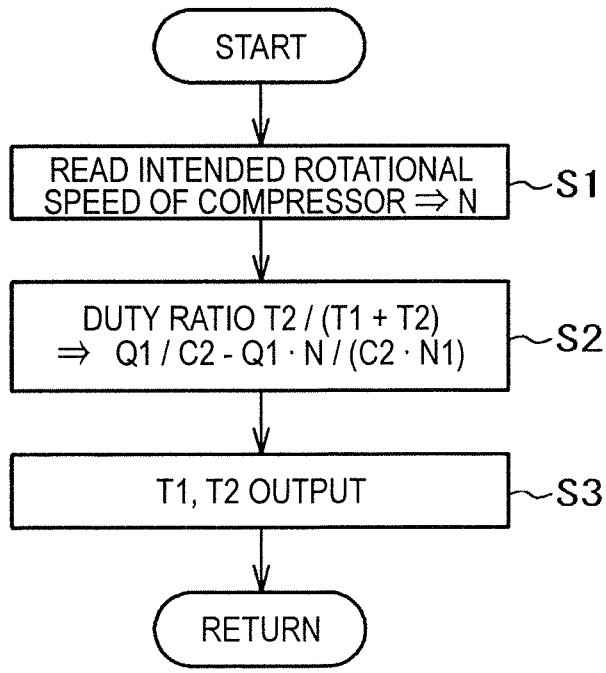
FIG. 3 is a control flow chart illustrating a control of an amount of oil supply according to Example 1 of the present invention.

A control flow chart of an oil supply amount control is illustrated in FIG. 3. When control of the solenoid valve 61 starts, firstly, an intended rotational speed N of the compressor is read (step S1). Then in step S2, since the coefficient C2, Q1, and N1 are known as illustrated in FIG. 2, the duty ratio T2/(T1+T2) can be obtained by the current intended rotational speed N which is read in step S1. The obtained periods T1 and T2 are output to the solenoid valve 61 from the solenoid-driver circuit of the oil supply amount controlling unit 80 as a pulse width modulation control signal (step S3). For example, every time when the rotational speed of the compressor changes, steps S1 to S3 may be repeated so that the amount of oil supplied to the suction pipe 14 from the oil reservoir 53 can be controlled according to the rotational speed of the compressor.

As described above, by adjusting the flow rate by switching the solenoid valve 61 to the opening state or closing state along with changing the ratio of closing time (period T1) to opening time (period T2) of the solenoid valve 61, the amount of oil supply can be varied within a range of 0-100%.

The refrigerant compressor according to Example 1 of the present invention described above provides an optimum oil supply in which a leakage of refrigerant from the compression chamber can be prevented and also a loss caused by a refrigerant heated by oil can be minimized within a wide range of the rotational speed from a high-capacity and high-speed rotation operation mode to an ultra-low speed operation mode in which an operation is carried out with a very low rotational speed (e.g., about 5-20 Hz). Consequently, a refrigerant compressor, having high efficiency under a wide range of operation, corresponding to any amount of load capacity can be provided.

Example 2

Figure 4:
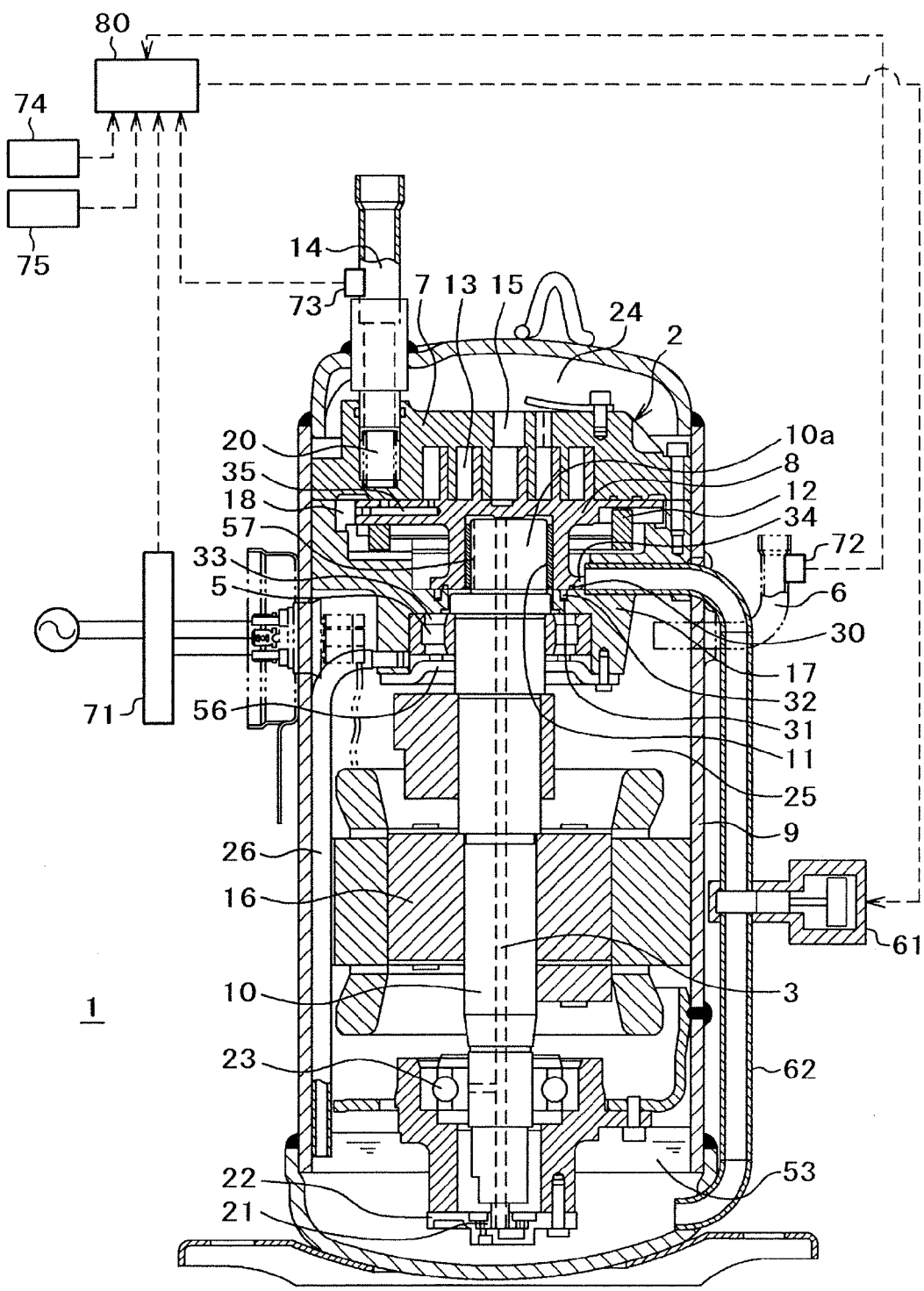
FIG. 4 is a longitudinal cross sectional view of a refrigerant compressor illustrating Example 2 of the present invention.

Example 2 of the present invention will be described referring to FIGS. 4 to 6. FIG. 4 is a longitudinal cross sectional view of a scroll compressor as a refrigerant compressor of the Example. In FIG. 4, a component with the same reference sign as in FIG. 1 is same as, or equivalent to, the component in FIG. 1. A description on a component or an equivalent component which is illustrated in FIG. 1 is omitted. Example 2 is different from the Example 1 in that the oil supply pipe 62 is provided so as to link the oil reservoir 53 and the back pressure chamber 18. Similar to Example 1, an oil supply amount adjusting means (solenoid valve) 61 is provided along the oil supply pipe 62.

When the solenoid valve is switched on (opening) by pulse width modulation control (PWM control), the oil supply pipe 62 connecting the high pressure oil reservoir 53 and the back pressure chamber 18 having an intermediate pressure between high pressure and low pressure links the oil reservoir 53 and the back pressure chamber 18 by passage, and the oil in the oil reservoir 53 is supplied to the back pressure chamber 18. Further, when the solenoid valve 61 is switched off (closing), the link provided by the oil supply pipe is cut off and the oil supply stops. The oil which entered the back pressure chamber 18 flows into the compression chamber 13 via the back pressure pass 35 which link the back pressure chamber 18 and the compression chamber 13 by passage when the back pressure is high.

Similar to Example 1, the Example includes an oil escape means configured with a plurality of holes 30 provided in a bearing boss portion 34 and a sealing part 32. However, the oil escape means is not mandatory in the Example. This is because the oil, of which the flow rate is controlled by the oil supply amount adjusting means (solenoid valve) 61, is supplied to the back pressure chamber 18 and lubricates the Oldham-coupling ring 12 and the sliding portion of the fixed scroll 7 and the orbiting scroll 8, and is then supplied to the compression chamber.

In the Example, the amount of oil supply to the Oldham-coupling ring 12 and the amount of oil supply to the sliding portion of the fixed scroll 7 and the orbiting scroll 8 cannot be controlled independently to each other. Therefore, a component having a suitable wear resistance may preferably be used for the Oldham-coupling ring 12 and the sliding portion of the fixed scroll 7 and the orbiting scroll 8, in order to secure sufficient reliability even in a case when the amount of oil supply to the compression chamber 13 is restricted.

According to the Example, the amount of oil supplied via the oil supply amount adjusting means 61 increases to the amount which is the sum of the amount of oil supply to the Oldham-coupling ring 12 and the amount of oil supply to the sliding portion of the fixed scroll 7 and the orbiting scroll 8. This enables the flow control easier to carry out.

Now, the oil supply amount control which is carried out by the oil supply amount controlling unit 80 will be described. Similar to Example 1, the oil supply amount controlling unit 80 determines the periods T1 and T2 of a square wave of a pulse width modulation control signal according to the rotational speed of the compressor. In the refrigerant compressor described in the Example, the periods T1 and T2 of the pulse width modulation control signal output from the solenoid-driver circuit of the oil supply amount controlling unit 80 is determined according to the predetermined table so that the amount of oil supply shows the characteristic as illustrated in FIG. 5. The basic equation of a relation between the amount of oil supply Q and the periods T1 and T2 of the pulse width modulation control signal is same as Equation 1 as described above.

In the Example, control is carried out in a manner that the amount of oil supply is reduced as the rotational speed of the compressor increases. When the rotational speed of the compressor is at a minimum rotational speed, the intended amount of oil supply is Q1 (e.g., 80 cc/min), and when the rotational speed of the compressor is N1 (e.g., 45 Hz), the intended amount of oil supply is Q2 (e.g., 45 cc/min). Further, the ratio of the period T1 to the period T2 is changed so as the amount of oil supply be at a constant value of Q2 when the rotational speed is N1 or higher. The rotational speed of the compressor is detected when a signal of an intended rotational speed in a compressor driving circuit 71 is input to the oil supply amount controlling unit 80.

Figure 5:
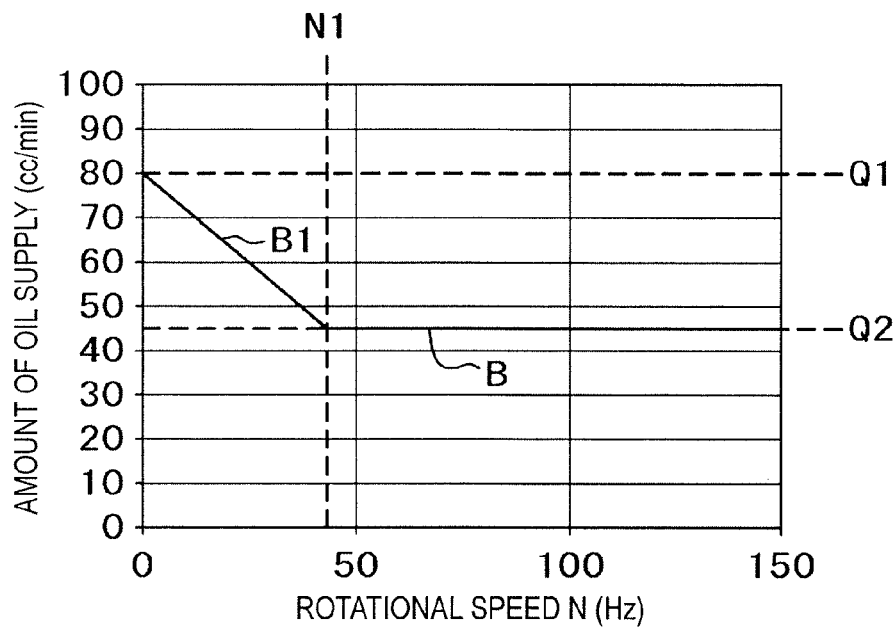
FIG. 5 is a chart illustrating a relation between a rotational speed of a compressor and an intended amount of oil supply according to Example 2 of the present invention.
Figure 6:
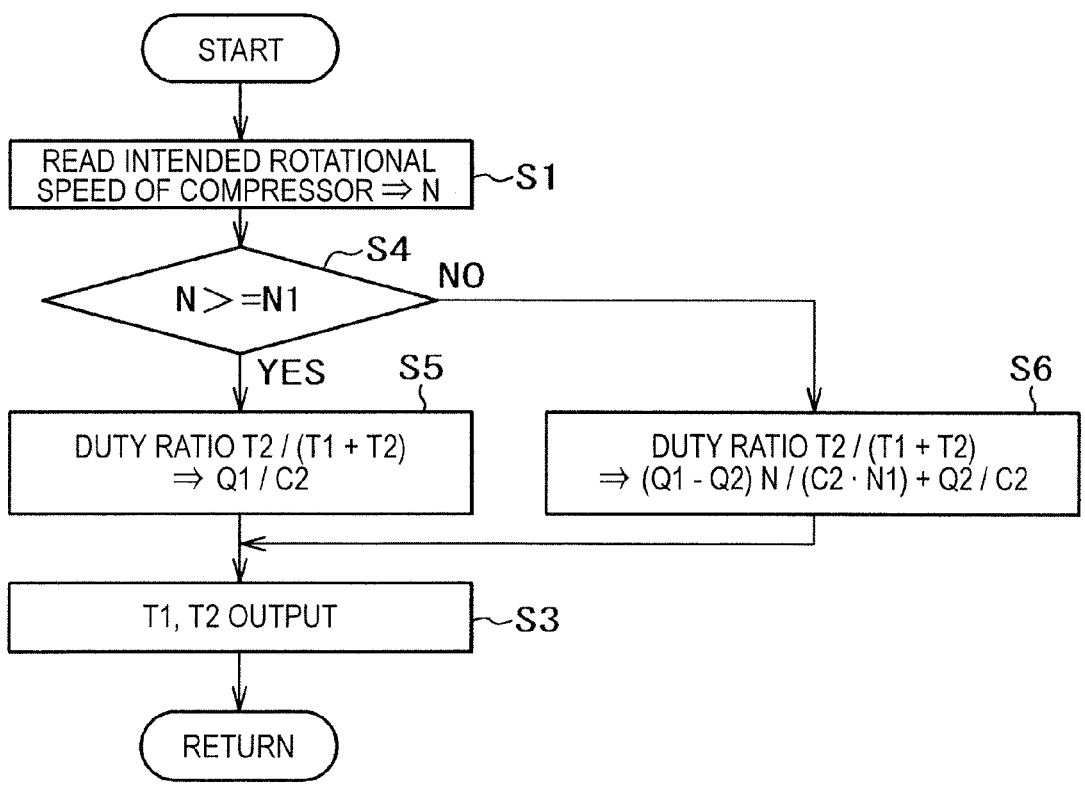
FIG. 6 is a control flow chart illustrating an amount of oil supply according to Example 2 of the present invention.

The control flow chart of the oil supply amount control is illustrated in FIG. 6. When control of the solenoid valve 61 starts, firstly, an intended rotational speed N of the compressor is read (step S1). Then in step S4, the read intended rotational speed N is compared whether the read intended rotational speed N is identical to, or higher than, a rotational speed N1 which is shown in FIG. 5. When N is identical to, or higher than, N1 (45 Hz in FIG. 5), the step proceeds to step S5 in which the duty ratio T2/(T1+T2) is determined so that the amount of oil supply is minimum, that is, Q2 (45 cc/min in FIG. 5) as illustrated in line B which represents the characteristic of oil supply in the Example as illustrated in FIG. 5. The obtained periods T1 and T2 are output to the solenoid valve 61 as a pulse width modulation control signal from the solenoid-driver circuit of the oil supply amount controlling unit 80 (step S3).

In step S4, when the read intended rotational speed N is lower than the rotational speed N1 illustrated in FIG. 5, the step proceeds to step S6, in which the amount of oil supply (this amount of oil supply corresponds to a portion having a gradient, which is illustrated as B1, in line B representing an characteristics of oil supply in FIG. 5) is obtained by the equation shown in step S6. The duty ratio T2/(T1+T2) is determined so as to give the obtained amount of oil supply. The obtained periods T1 and T2 are output to the solenoid valve as a pulse width modulation control signal from the solenoid-driver circuit of the oil supply amount controlling unit 80 (step S3).

For example, every time when the rotational speed of the compressor changes, steps S1, S4 to S6, and S3 may be repeated so that the amount of oil supplied to the back pressure chamber 18 from the oil reservoir 53 can be controlled according to the rotational speed of the compressor.

Example 3

A refrigeration cycle apparatus using a refrigerant compressor illustrating Example 3 of the present invention will be described based on FIG. 7. In each of Examples, description will be made based on a configuration using the refrigerant compressor described in Example 1 as a refrigerant compressor. However, the refrigerant compressor described in Example 2 can be used to carry out almost the same operation as that using the refrigerant compressor of Example 1.

Figure 7:
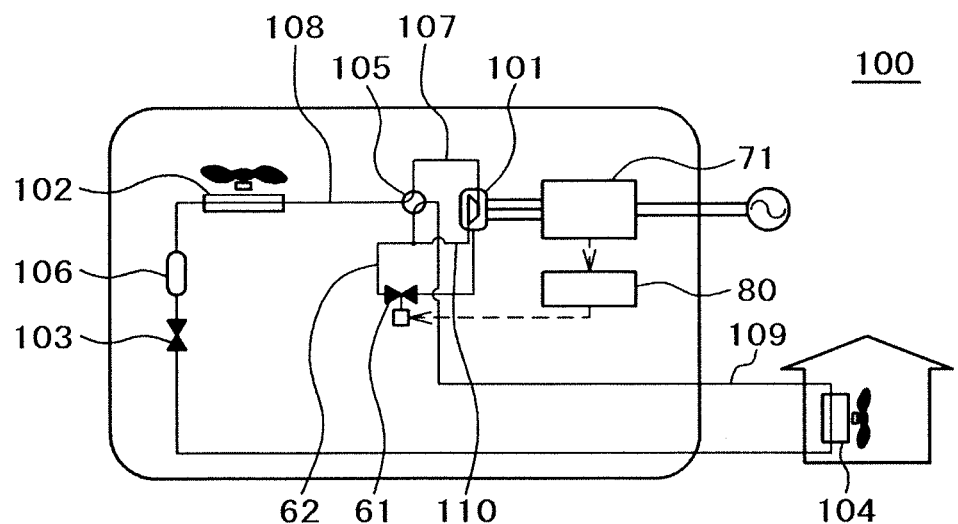
FIG. 7 is a schematic configuration view of a refrigeration cycle apparatus using a refrigerant compressor illustrating Example 3 of the present invention.

FIG. 7 illustrates a refrigeration cycle apparatus (air conditioning apparatus) 100 which is a room air conditioner using the refrigerant compressor of Example 1. In the refrigeration cycle apparatus illustrated in FIG. 7, when operated for cooling, a refrigerant compressed in a compressor 101 flows into a four-way valve 105 from a high pressure side connecting pipe 107 and then flows out to an outdoor-connecting pipe 108 and into an outdoor heat exchanger 102. In the outdoor heat exchanger 102, high temperature and high pressure refrigerant gas exchanges heat with outdoor air to be condensed and liquefied, and then is decompressed by an expansion valve 103 after passing through a liquid receiver 106. The decompressed refrigerant having low temperature and low pressure flows into an indoor heat exchanger 104 and exchanges heat with room air. The room air is cooled and at the same time the refrigerant vaporizes and gasifies by taking heat from the room air. The refrigerant gas flows into the four-way valve 105 from an indoor-connecting pipe 109, flows out from a connecting port in the low pressure side of the four-way valve 105, and passes through a low pressure side connecting pipe 110. And the refrigerant returns to the suction side of the compressor 101 again, and is compressed again. A similar cycle is repeated.

In a case of switching from cooling operation to heating operation, connection to the refrigerant tube of the four-way valve 105 is switched so that the refrigerant gas having high temperature and high pressure discharged from the compressor 101 flows into the four-way valve 10 from the high pressure side connecting pipe 107 and flows out to the indoor-connecting pipe 109 and to the indoor heat exchanger 104. And by radiating heat of the refrigerant gas to the room air, the heating operation can be carried out. The refrigerant gas is condensed in the indoor heat exchanger 104 and decompressed in the expansion valve 103. Then the refrigerant having low temperature and low pressure exchanges heat with outdoor air in the outdoor heat exchanger 102 to vaporize and gasify, flows into the four-way valve 105 from the outdoor-connecting pipe 108, and then flows out to the low pressure side connecting pipe 110 to be sucked by the compressor 101 again. This refrigeration cycle is repeated.

An oil supply pipe 62 links the oil reservoir 53 in the bottom portion of the compressor and the low pressure side tube 110 which is the suction side of the compression mechanism 2 by passage, as illustrated in FIG. 1. An oil supply amount adjusting means (solenoid valve) 61 is provided along the oil supply pipe 62. The amount of oil supply from the oil reservoir 53 to the low pressure side connecting pipe 110 is adjusted by controlling the oil supply amount adjusting means 61. The oil supply amount adjusting means 61 controls the closing state and the opening state of the valve by a pulse width modulation control signal output from the oil supply amount controlling unit 80, by which the amount of oil supply can be varied from 0 to 100%.

As for a room air conditioner, a temperature sensor (not shown in the drawing) is provided in the vicinity of an inlet of a ventilation flue of the indoor heat exchanger 104 installed in the room. The room temperature is detected by the temperature sensor and control is carried out in a manner that the rotational speed of the compressor 101 is varied by an inverter apparatus (compressor driving circuit) 71 so that the room temperature matches the intended temperature determined by a user. The oil supply amount controlling unit 80 reads the intended rotational speed of the compressor from the inverter apparatus 71, determines the periods T1 and T2 of a square wave of the pulse width modulation control signal according to the read intended rotational speed of the compressor, and outputs the periods T1 and T2 to the oil supply amount adjusting means 61.

Example 4

Figure 8:
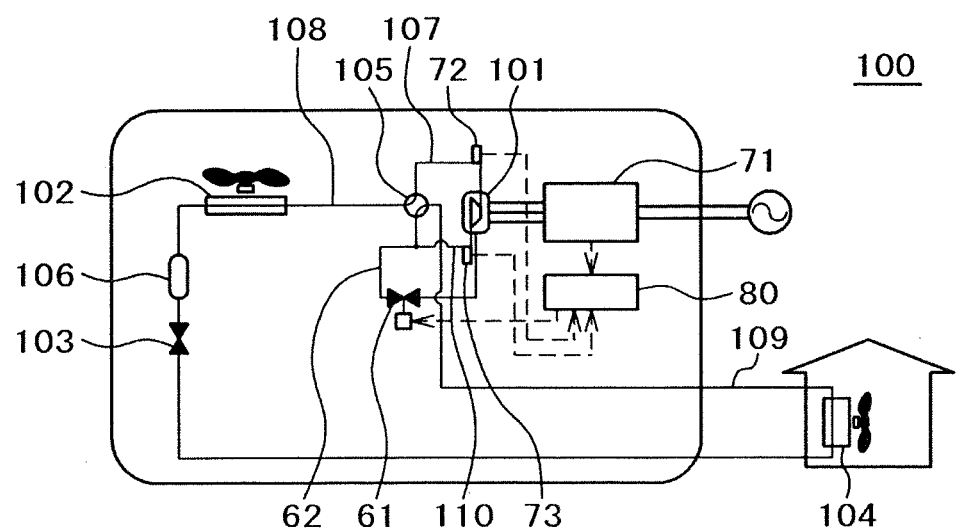
FIG. 8 is a schematic structural view of a refrigeration cycle apparatus using a refrigerant compressor illustrating Example 4 of the present invention.

A refrigeration cycle apparatus using a refrigerant compressor illustrating Example 4 of the present invention will be described based on FIGS. 8 to 10. A refrigeration cycle apparatus illustrated in FIG. 8 is also used as a room air conditioner and the basic operation of a refrigeration cycle is same as that of refrigeration cycle in FIG. 7 as described above. The same reference sign is used for the same portion as in FIG. 7 and description thereof is omitted.

In FIG. 8, the oil supply amount adjusting means (solenoid valve) 61 is controlled by the oil supply amount controlling unit 80 using pulse width modulation control. The oil supply amount controlling unit 80 reads the intended rotational speed of the compressor from the inverter apparatus 71. Further, in the Example, a discharge pressure detecting means 72 (see FIG. 1) is provided on the discharge pipe 6, and a suction pressure detecting means 73 (see FIG. 1) is provided on the suction pipe 14. By these detecting means 72 and 73, the discharge pressure and the suction pressure are also detected. The periods T1 and T2 of a square wave of the pulse width modulation control signal are determined according to the intended rotational speed and the detected discharge pressure and suction pressure, and output to the oil supply amount adjusting means 61.

Figure 9:
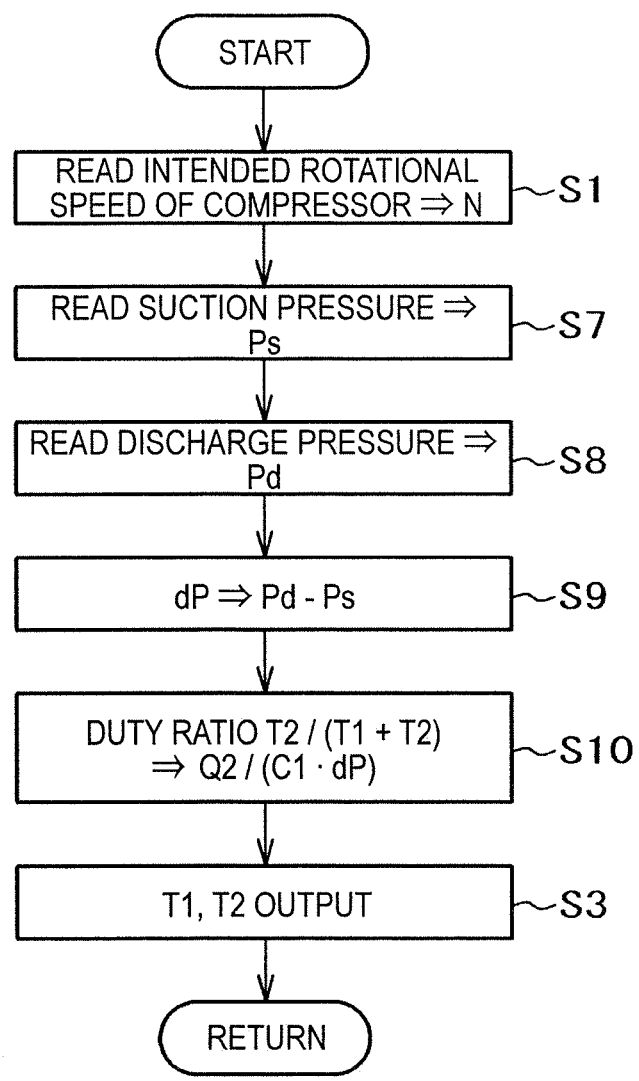
FIG. 9 is a control flow chart illustrating a control of an amount of oil supply according to Example 4 of the present invention.
Figure 10:
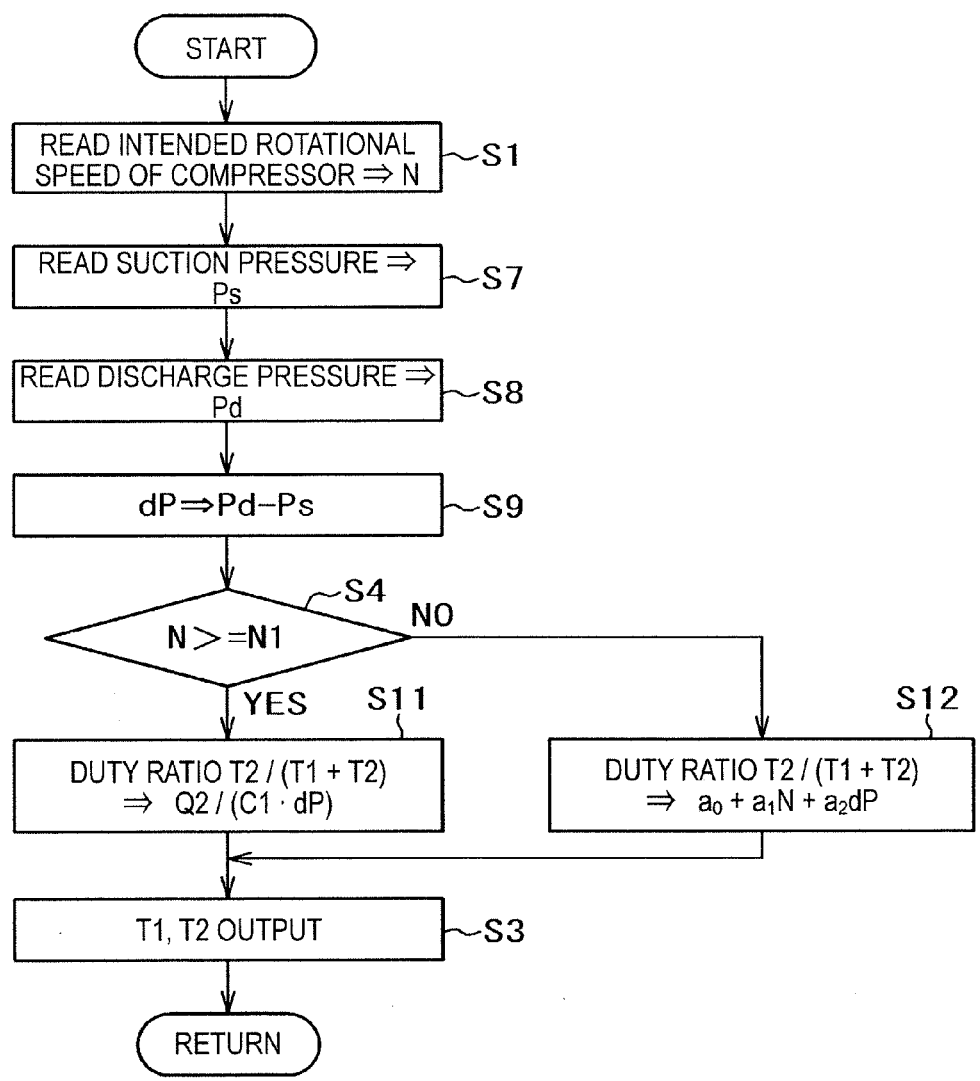
FIG. 10 is a control flow chart illustrating another example of a control of an amount of oil supply according to Example 4 of the present invention.

A control flow chart for controlling an amount of oil supply according to Example 4 is illustrated in FIG. 9. The amount of oil supply passing through the solenoid valve (oil supply amount adjusting means) 61 depends not only on a ratio of a closing state time (period T1) to an opening state time (period T2) of the solenoid valve but also on a pressure difference $\Delta P$. Therefore, in the Example, the pressure difference dP is calculated (step S9) from the discharge pressure Pd and the suction pressure Ps detected (step S7 and step S8) by the discharge pressure detecting means 72 and the suction pressure detecting means 73. The periods T1 and T2 are corrected so as the amount of oil supply be optimum based on the calculated pressure difference dP (step S10). The obtained periods T1 and T2 are output to the solenoid valve as a pulse width modulation control signal from the solenoid-driver circuit of the oil supply amount controlling unit 80 (step S3). For example, every time when the rotational speed of the compressor changes, steps S1, S7 to S10, and S3 may be repeated so that the amount of oil supplied to the suction pipe 14 from the oil reservoir 53 can be controlled according to the rotational speed of the compressor.

In this manner, the amount of oil supply can suitably be adjusted and a highly efficient operation can be carried out under operation conditions with a certain rotational speed but with different operation pressures.

In the Example, the abovementioned refrigerant compressor of Example 1 is used as a refrigerant compressor in the description. In a case when the abovementioned refrigerant compressor of Example 2 is used, a control flow chart for controlling the amount of oil supply will be such as illustrated in FIG. 10. In FIG. 10, each of steps S1, S7 to S9, and S3 is same as that illustrated in FIG. 9. The example illustrated in FIG. 10 is different from the example illustrated in FIG. 9 regarding steps S4, S11, and S12. In step S4, the read intended rotational speed N is compared whether the read intended rotational speed N is identical to, or higher than, a rotational speed N1 which is shown in FIG. 5. When N is identical to, or higher than, N1, the step proceeds to step S11. In step S11, a duty ratio T2/(T1+T2) is determined so that the amount of oil supply is minimum, that is, Q2/(C1·dP) in which the pressure difference obtained in step S9 is taken into account. The obtained periods T1 and T2 are output to the solenoid valve 61 as a pulse width modulation control signal from the solenoid-driver circuit of the oil supply amount controlling unit 80 (step S3).

In step S4, when the read intended rotational speed N is smaller than the rotational speed N1, the step proceeds to step S12. The amount of oil supply is obtained by the equation shown in step S12, that is, an equation for determining a duty ratio according to the rotational speed N and the pressure difference dP. The duty ratio T2/(T1+T2) is determined so as the amount of oil supply be the obtained amount of oil supply. In the equation for calculation shown in step S12, each of $a_0$, $a_1$, and $a_2$ is a predetermined coefficient.

Then the step proceeds to step S3, and the obtained periods T1 and T2 are output from the solenoid-driver circuit of the oil supply amount controlling unit 80 to the solenoid valve 61 as a pulse width modulation control signal.

For example, every time when the rotational speed of the compressor changes, steps S1, S7 to S9, S4, S11, S12, and S3 may be repeated so that the amount of oil supplied to the back pressure chamber 18 from the oil reservoir 53 can be controlled according to the rotational speed of the compressor and the pressure difference.

Example 5

Figure 11:
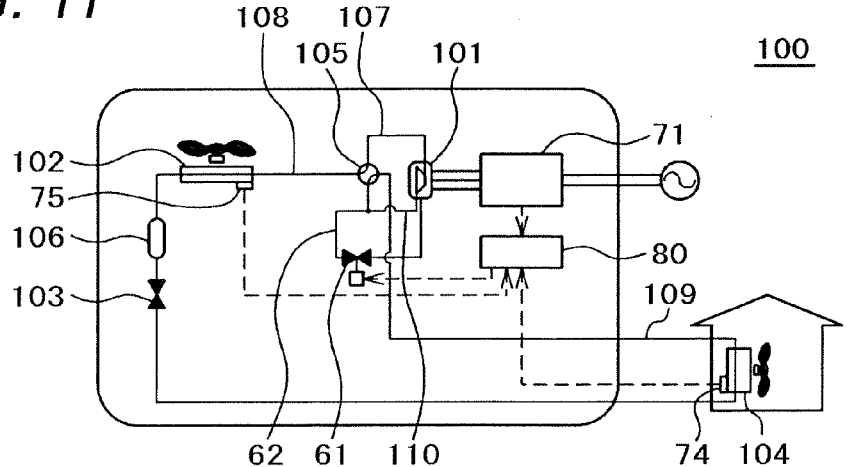
FIG. 11 is a schematic structural view of a refrigeration cycle apparatus using a refrigerant compressor illustrating Example 5 of the present invention.

FIG. 11 is a schematic structural view of a refrigeration cycle apparatus using a refrigerant compressor illustrating Example 5 of the present invention. In the example, the refrigeration cycle apparatus is applied to a room air conditioner as a refrigeration cycle apparatus. In FIG. 11, a portion with the same reference sign as in FIG. 7 is same as the portion with the same reference sign in FIG. 7. A description on a portion which is illustrated in FIG. 7 is omitted.

In FIG. 11, the oil supply amount adjusting means (solenoid valve) 61 is controlled by the oil supply amount controlling unit 80 using pulse width modulation control. The oil supply amount controlling unit 80 obtains a signal of the intended rotational speed N of the compressor from the inverter apparatus (compressor driving circuit) 71 and at the same time detects the evaporating temperature and the condensing temperature by the temperature sensor 74 provided on the indoor heat exchanger 104 and the temperature sensor 75 provided on and the outdoor heat exchanger 102. The periods T1 and T2 of a square wave of the pulse width modulation control signal is determined according to the detected evaporating temperature and the condensing temperature and is output to the oil supply amount adjusting means 61.

Figure 12:
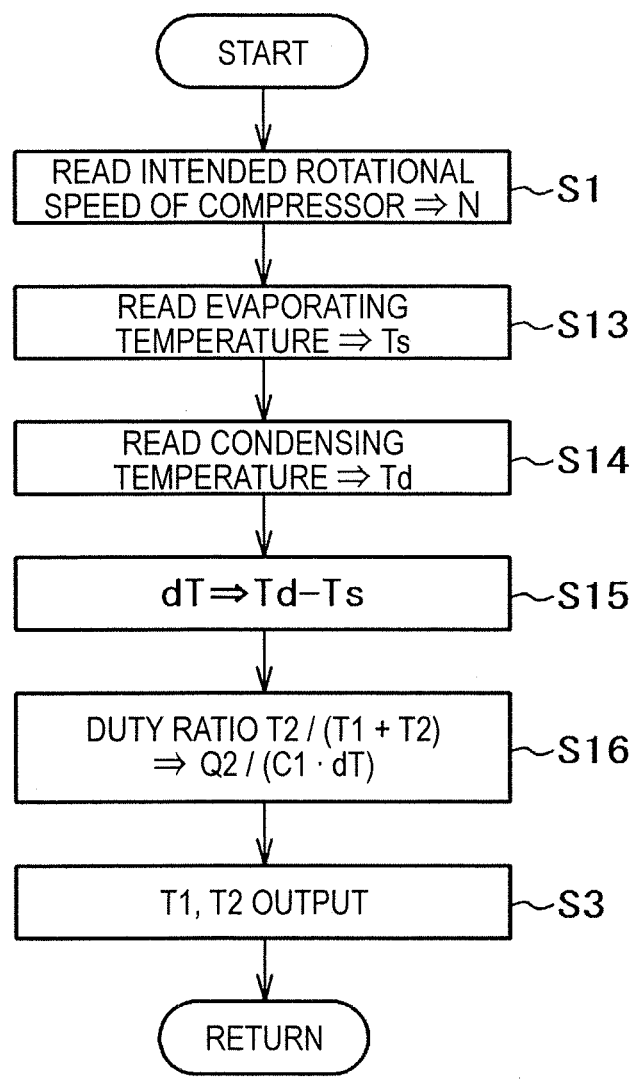
FIG. 12 is a control flow chart illustrating a control of an amount of oil supply according to Example 5 of the present invention.

A control flow chart for controlling an amount of oil supply according to the Example is illustrated in FIG. 12. The amount of oil supply passing through the solenoid valve (oil supply amount adjusting means) 61 depends not only on a ratio of a closing state time (period T1) to an opening state time (period T2) of the solenoid valve but also on a pressure difference ΔP. Therefore, the Example is configured that the pressure difference ΔP is estimated from the evaporating temperature and the condensing temperature detected by the temperature sensor 74 provided on the indoor heat exchanger 104 and the temperature sensor 75 provided on and the outdoor heat exchanger 102, and the periods T1 and T2 are corrected so as the amount of oil supply be optimum. According to the Example, the amount of oil supply can suitably be adjusted under operation conditions with different operation pressures without using a pressure detecting means (pressure sensor) 72 and 73 which are described above in Example 4, and the effect similar to that of Example 4 can be obtained.

The control flow chart illustrated in FIG. 12 is different from the control flow chart illustrated in FIG. 9 regarding steps S13 to S16. In other words, in the Example, the evaporating temperature Ts and the condensing temperature Td detected by the temperature sensor 74 and 75 are read (step S13, S14), the temperature difference dT between Ts and Td is obtained (step S15), and the periods T1 and T2 corrected based on the obtained temperature difference dT so as the amount of oil supply be optimum (step S16). Other steps are similar to those in the control illustrated in FIG. 9. In the Example, similar to Example 4, the amount of oil supply can suitably be adjusted under operation conditions with a certain rotational speed but with different operation pressures.

Figure 13:
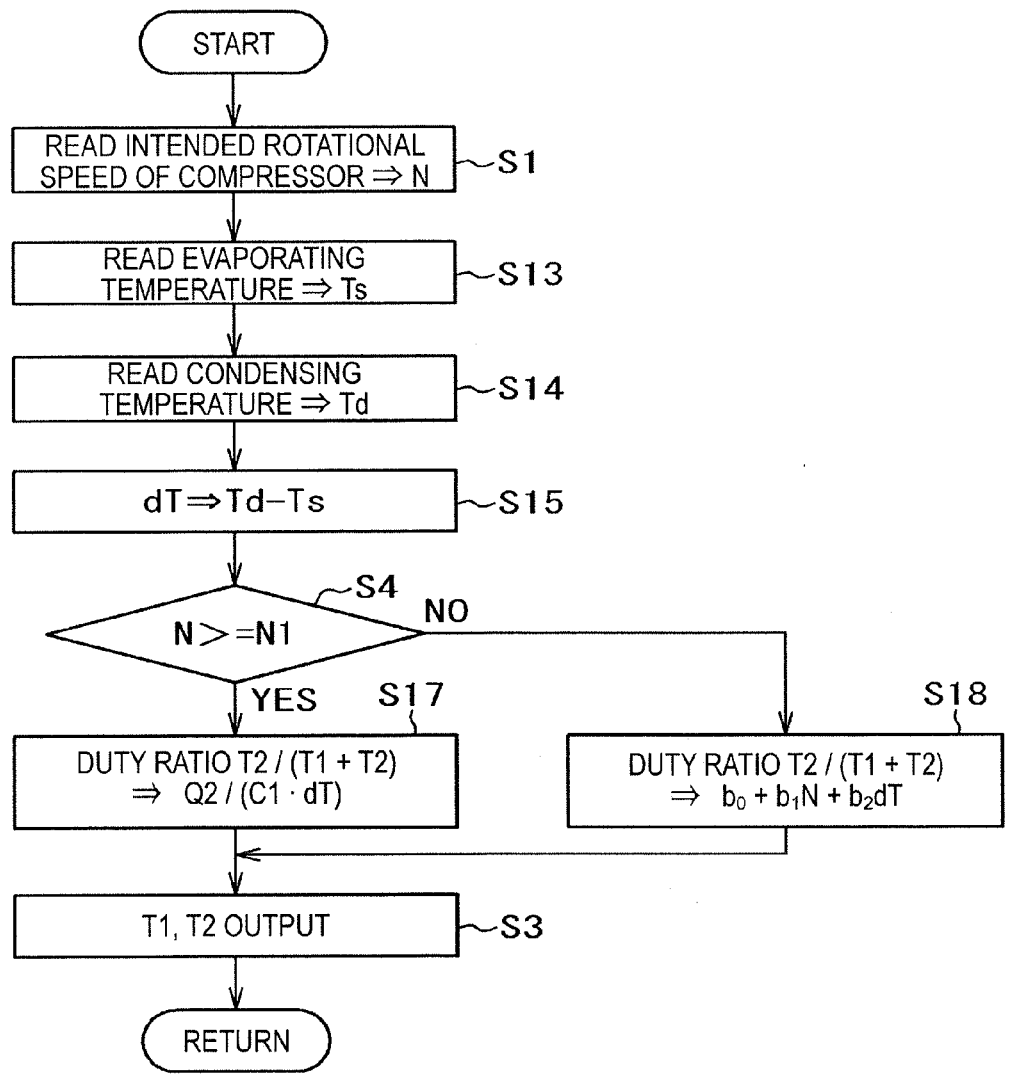
FIG. 13 is a control flow chart illustrating another example of a control of an amount of oil supply according to Example 5 of the present invention.

The control flow chart represents a case in which the refrigerant compressor of Example 1 is used as a refrigerant compressor. In a case when the refrigerant compressor of Example 2 is used, the control flowchart for controlling the amount of oil supply will be such as illustrated as in FIG. 13. In FIG. 13, each of steps S1, S13 to S15, and S3 is same as that illustrated in FIG. 12. The example illustrated in FIG. 13 is different from the example illustrated in FIG. 12 regarding steps S4, S17, and S18.

In step S4, the read intended rotational speed N is compared whether the read intended rotational speed N is identical to, or higher than, a rotational speed N1 which is shown in FIG. 5. When N is identical to, or higher than, N1, the step proceeds to step S17. In step S17, a duty ratio T2/(T1+T2) is determined so that the amount of oil supply is minimum, that is, Q2/(C1·dT) in which the temperature difference dT obtained in step S15 is taken into account. The obtained periods T1 and T2 are output to the solenoid valve 61 as a pulse width modulation control signal from the solenoid-driver circuit of the oil supply amount controlling unit 80 (step S3).

In step S4, when the read intended rotational speed N is lower than the rotational speed N1, the step proceeds to step S18. The amount of oil supply is obtained by a calculation equation shown in step S18, that is, an equation for determining a duty ratio according to the rotational speed N and the temperature difference dT. The duty ratio T2/(T1+T2) is determined so as the amount of oil supply be the obtained amount of oil supply. In the calculation equation shown in step S18, each of $b_0$, $b_1$, and $b_2$ is a predetermined coefficient.

Then the step proceeds to step S3, and the obtained periods T1 and T2 are output from the solenoid-driver circuit of the oil supply amount controlling unit 80 to the solenoid valve 61 as a pulse width modulation control signal.

For example, every time when the rotational speed of the compressor changes, steps S1, S13 to S15, S4, S17, S18, and S3 may be repeated so that the amount of oil supplied to the back pressure chamber 18 from the oil reservoir 53 can be controlled according to the rotational speed of the compressor and the temperature difference.

Example 6

Figure 14:
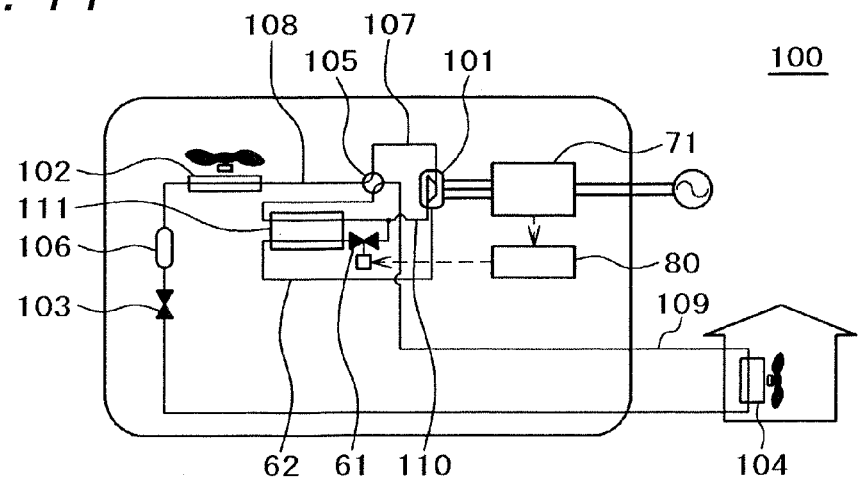
FIG. 14 is a schematic structural view of a refrigeration cycle apparatus using a refrigerant compressor according to Example 6 of the present invention.

FIG. 14 is a schematic structural view of a refrigeration cycle apparatus using a refrigerant compressor illustrating Example 6 of the present invention. Also in the Example, the refrigeration cycle apparatus is applied to a room air conditioner as a refrigeration cycle apparatus. In FIG. 14, a portion with the same reference sign as in FIG. 7 is same as, or equivalent to, the portion in FIG. 7. A description on a portion or an equivalent portion which is illustrated in FIG. 7 is omitted.

In the Example, the oil supply pipe 62 provided along the oil supply amount adjusting means 61 connects the oil reservoir in the lower portion of the compressor 101 and the low pressure side connecting pipe 110. A refrigerant/oil heat exchanger (oil cooling means) 111 is provided between the oil supply amount adjusting means 61 and the oil reservoir in the lower portion of the compressor 101. By switching the oil supply amount adjusting means 61 to an opening state, the oil flowing from the oil reservoir 53 in the lower portion of the compressor (bottom portion of the sealed case 9) to the low pressure side connecting pipe 110 passes through the refrigerant/oil heat exchanger 111 by which the oil exchanges heat with a low pressure side refrigerant which is at almost evaporating temperature. In this manner, the temperature of the oil supplied to the low pressure side connecting pipe 110 decreases, which makes the viscosity of the oil high.

Similar to Examples described above, a solenoid valve may be used as the oil supply amount adjusting means 61. In this case, the flow adjustment of oil may be carried out by the method described above in Example 1 or Example 2, although the value of the coefficients C1 and C2 are different from each other since the viscosity of the oil increases due to the effect of the refrigerant/oil heat exchanger 111. However, in the Example, an electric needle valve is employed instead of a solenoid valve as an oil supply amount adjusting means 61. The electric needle valve is configured so that the valve opening is controlled by a pulse number modulation control signal output from the oil supply amount controlling unit 80, and that the amount of oil supply can be varied from 0 to 100%. A coefficient (corresponding to the coefficient C2 described above) which is determined by a flow coefficient of a valve, flow resistance of a pipe, and the like decreases as the viscosity of the oil increases. Therefore, and since the temperature of the oil is low which means the viscosity of the oil is high, a large opening can be employed in the Example compared to a case in which flow adjustment is carried out for the oil with high temperature and low viscosity. Consequently, it is easy to carry out a flow control at a very small flow rate, and since a large flow passage can be employed, a problem of clogging caused by a foreign object can be avoided, which enables to use a needle valve.

Further, in the Example, since an electric needle valve capable of continuously varying the valve opening is used, the electric needle valve does not produce a noise made by open and close motion of a valve, which can be heard from a solenoid valve, and therefore has a good effect in terms of noise reduction.

The oil supply amount adjusting means 61 is controlled by the oil supply amount controlling unit 80 using pulse number modulation control. In the refrigerant compressor of the Example, the number of pulse of the pulse number modulation control signal from a pulse drive circuit is determined according to a predetermined table so as the amount of oil supply be at an intended flow rate within a range of 0 to, for example, 60 cc/min. The oil supply amount controlling unit 80 obtains information of the intended rotational speed N of the compressor from the inverter apparatus (compressor driving circuit) 71, and determines the number of pulse according to the intended rotational speed. Then the oil supply amount controlling unit 80 output the number of pulse to the electric needle valve (oil supply amount adjusting means) 61 which is driven by a stepping motor.

Example 7

Figure 15:
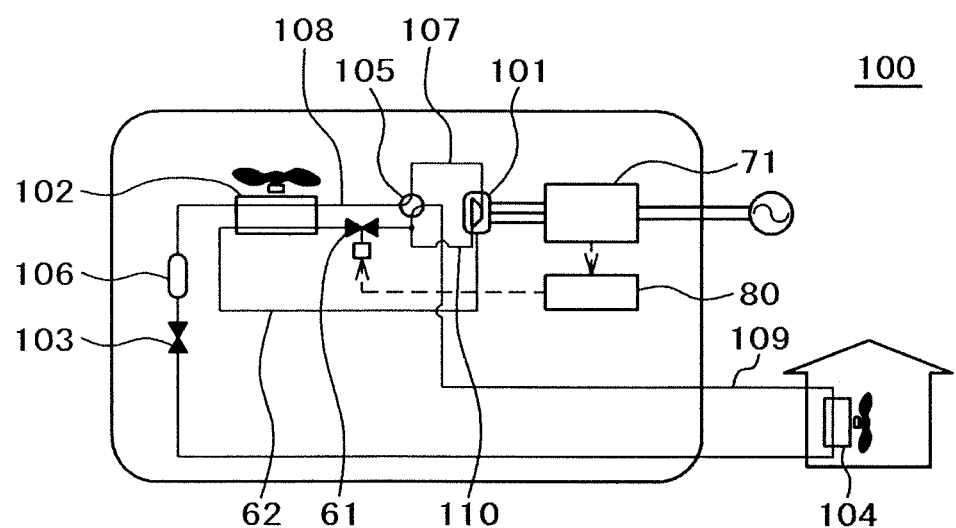
FIG. 15 is a schematic structural view of a refrigeration cycle apparatus using a refrigerant compressor according to Example 7 of the present invention.

FIG. 15 is a schematic structural view of a refrigeration cycle apparatus using a refrigerant compressor illustrating Example 7 of the present invention. Also in the example, the refrigeration cycle apparatus is applied to a room air conditioner as a refrigeration cycle apparatus. In FIG. 15, a portion with the same reference sign as in FIG. 14 is same as, or equivalent to, the portion in FIG. 14. A description on a portion or an equivalent portion which is illustrated in FIG. 14 is omitted.

The Example illustrated in FIG. 15 is different from the Example illustrated in FIG. 14 in that the refrigerant/oil heat exchanger 111 in FIG. 14 is omitted and the outdoor heat exchanger 102 has the function of the refrigerant/oil heat exchanger. The oil supply pipe 62 arranged along the oil supply amount adjusting means (electric needle valve) 61 connects the oil reservoir in the lower portion of the compressor 101 and the low pressure side connecting pipe 110. And a portion of the oil supply pipe 62, which is a pipe between the oil supply amount adjusting means 61 and the oil reservoir in the lower portion of the compressor 101, is arranged in the outdoor heat exchanger 102 so that a portion of the outdoor heat exchanger 102 is used as a refrigerant/oil heat exchanger (oil cooling means).

Also in the Example, by switching the oil supply amount adjusting means 61 to an opening state, the oil flowing from the oil reservoir 53 in the lower portion of the compressor to the low pressure side connecting pipe 110 can exchange heat with a low pressure side refrigerant having a temperature of about the evaporating temperature by passing through the outdoor heat exchanger 102. Consequently, the temperature of the oil supplied to the low pressure side connecting pipe 110 can be reduced as in a similar manner to Example 6, and also a high viscosity of the oil can be provided.

Further in the Example, since the refrigerant/oil heat exchanger is provided as a portion of the outdoor heat exchanger 102, the refrigerant/oil heat exchanger need not be arranged in addition to the outdoor heat exchanger 102 inside a small outdoor unit of the room air conditioner (refrigeration cycle apparatus). Consequently, such effect of easy implementation along with cost reduction can be expected.

As described above, each of Examples of the present invention can provide an optimum oil supply in which both reduction of refrigerant leakage in a compression chamber and reduction of heating loss due to the oil heating the refrigerant can be achieved throughout the range of rotational speed from an operation mode with high-capacity and high-speed rotation to an ultra-low speed operation mode with very low rotational speed. As a result, a refrigerant compressor having high efficiency corresponding to any amount of load capacity, and a refrigeration cycle apparatus using the refrigerant compressor can be provided. Particularly, the Example provides operation having high efficiency when a room air conditioner installed in a high-insulated house is operated under a condition with very low rotational speed.

REFERENCE SIGNS LIST 1, 101 compressor
2 compression mechanism
3 oil pass
5 main bearing
6 discharge pipe
7 fixed scroll
8 orbiting scroll
9 sealed case
10 crank shaft
11 scroll-end bearing
12 Oldham-coupling ring
13 compression chamber
14 suction pipe
15 discharge port
16 motor part
17 frame
18 back pressure chamber (the second room)
20 suction chamber
21 oil supply pump
22 oil supply pump case
23 auxiliary bearing
24 discharge room
25 motor room
26 drain pipe
30 oil escape means (hole)
31 circular annular groove
32 sealing part
33 first room
34 bearing boss portion
35 back pressure pass
53 oil reservoir
56 frame seal (bearing support)
57 oil groove
61 oil supply amount adjusting means (solenoid valve, electric needle valve)
62 oil supply pipe
71 compressor driving circuit (inverter apparatus)
72 discharge pressure detecting means
73 suction pressure detecting means
74 room temperature sensor
75 outdoor temperature sensor
80 oil supply amount controlling unit
100 refrigeration cycle apparatus (air conditioning apparatus)
102 outdoor heat exchanger
103 expansion valve
104 indoor heat exchanger
105 four-way valve
106 liquid receiver
107 high pressure side connecting pipe
108 outdoor-connecting pipe
109 indoor-connecting pipe
110 low pressure side connecting pipe
111 refrigerant/oil heat exchanger (oil cooling means).

The invention claimed is:

1. A refrigerant compressor including a sealed case, a compression mechanism contained in the sealed case, a motor part which is contained in the sealed case and drives the compression mechanism via a crank shaft, and an oil reservoir formed in a lower portion of the sealed case, the refrigerant compressor further comprising:
an oil supply pipe which links the oil reservoir in the sealed case and a suction side of the compression mechanism by a passage and introduces oil in the oil reservoir to the suction side;
an oil supply amount adjusting means which is provided on the oil supply pipe and adjusts an amount of oil supply supplied to the suction side;
a rotational speed detecting means which detects a rotational speed of the motor part;
an oil supply amount controlling unit which controls the oil supply amount adjusting means according to a rotational speed detected by the rotational speed detecting means;
a discharge pressure detecting means which detects a pressure in a discharge side of the refrigerant compressor; and
a suction pressure detecting means which detects a pressure in a suction side of the refrigerant compressor,
wherein the oil supply amount controlling unit controls the oil supply amount adjusting means in a manner that an amount of oil supply supplied to the suction side from the oil supply pipe decreases as a rotational speed of the motor part increases, and
wherein the oil supply amount controlling unit controls the oil supply amount adjusting means so as to further decrease the amount of oil supply as a pressure difference between a discharge pressure detected by the discharge pressure detecting means and a suction pressure detected by the suction pressure detecting means increases.

2. The refrigerant compressor according to claim 1, further comprising:
a suction pipe which penetrates the sealed case and introduces a refrigerant into a suction chamber of the compression mechanism, and
a discharge pipe which links with the inside of the sealed case by a passage and introduces a high pressure refrigerant in the sealed case to the outside of the sealed case,
wherein the suction pressure detecting means is provided on the suction pipe and the discharge pressure detecting means is provided on the discharge pipe.

3. The refrigerant compressor according to claim 1, wherein the oil supply amount adjusting means is a solenoid valve, and the oil supply amount controlling unit includes a solenoid-driver circuit which produces a pulse width modulation control signal for controlling opening and closing of the solenoid valve.

4. A refrigeration cycle apparatus comprising: a refrigerant compressor, an outdoor heat exchanger, an expansion valve, and a room heat exchanger are connected with a refrigerant tube,
wherein the refrigerant compressor according to claim 1 is used as the refrigerant compressor,
an outdoor temperature sensor which detects a temperature of the outdoor heat exchanger and a room temperature sensor which detects a temperature of the room heat exchanger are further provided, and
wherein the oil supply amount controlling unit provided in the refrigerant compressor carries out control so as to decrease an amount of oil supply as a rotational speed of a motor part increases, and further decreases the amount of oil supply as a temperature difference between a condensing temperature and an evaporating temperature detected by the outdoor temperature sensor and the room temperature sensor.

5. The refrigeration cycle apparatus according to claim 4, wherein an oil cooling means for cooling oil flowing in the oil supply pipe is provided along the oil supply pipe connecting an oil reservoir of the refrigerant compressor and a suction side of a compression mechanism.

6. The refrigeration cycle apparatus according to claim 5, wherein the oil cooling means is a refrigerant/oil heat exchanger which exchanges heat between a low temperature and low pressure refrigerant flowing in a low pressure side tube connected to a suction side of the refrigerant compressor, and a high temperature and high pressure oil flowing in the oil supply pipe.

7. The refrigeration cycle apparatus according to claim 5, wherein the oil cooling means is configured so that a portion of the outdoor heat exchanger is used as a refrigerant/oil heat exchanger by arranging a pipe between the oil supply amount adjusting means of the oil supply pipe and an oil reservoir in the outdoor heat exchanger.

8. The refrigeration cycle apparatus according to claim 5, wherein the oil supply amount adjusting means provided on the oil supply pipe is an electric needle valve.

* * * * *